United States Patent Office 3,389,213
Patented June 18, 1968

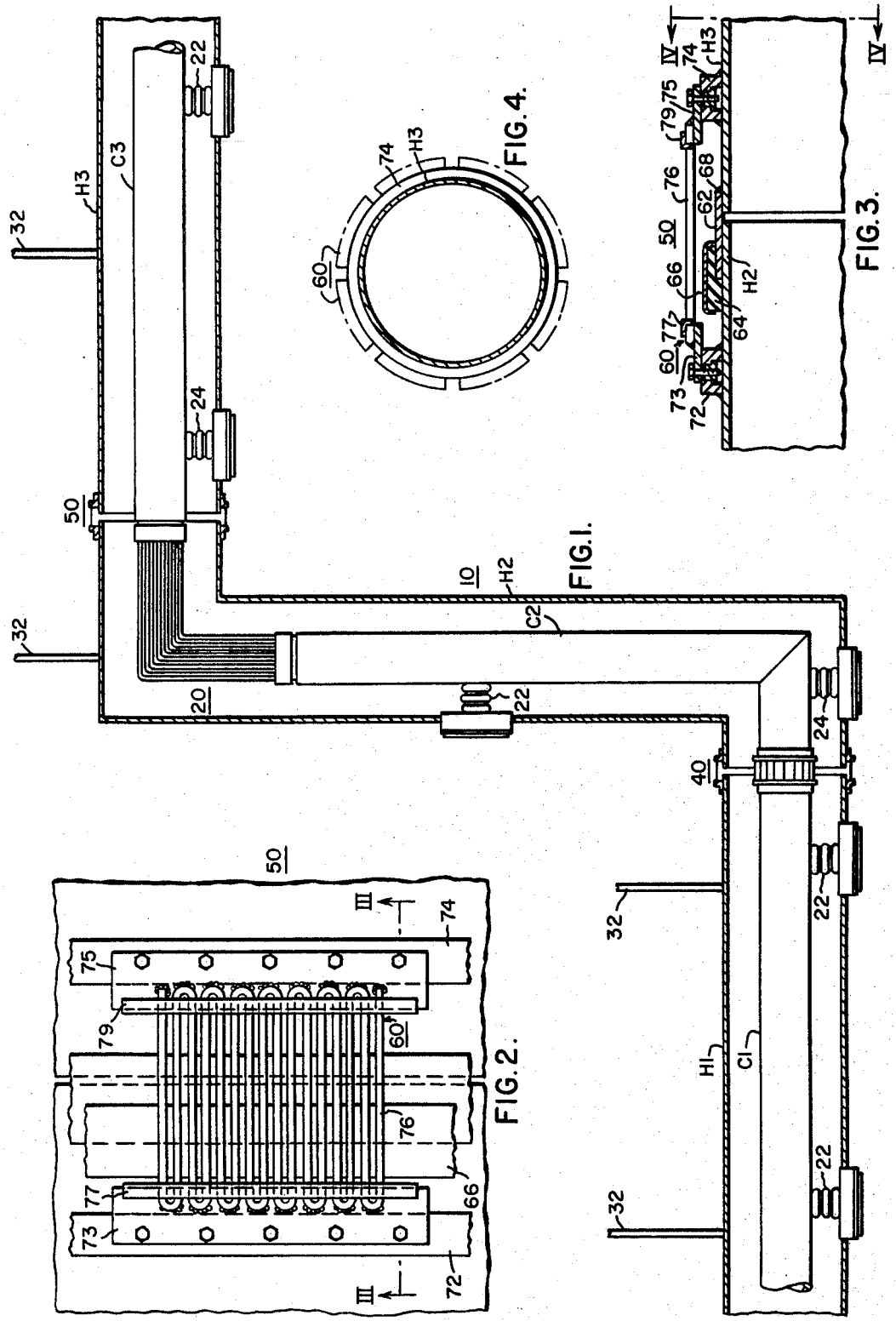

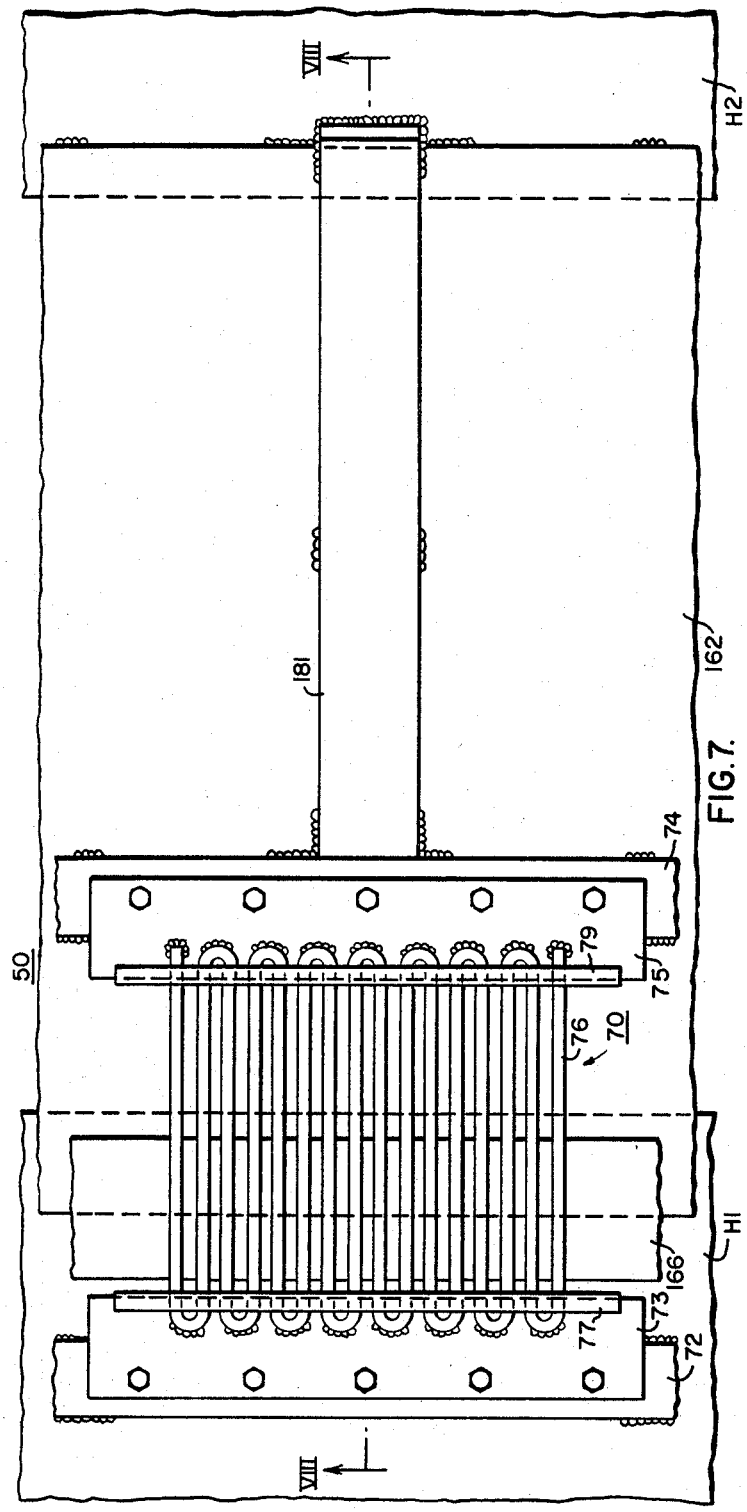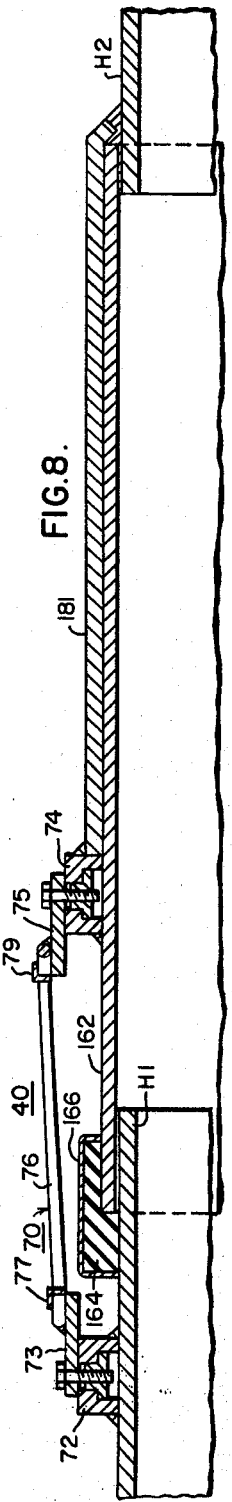

1

3,389,213
EXPANSION JOINTS FOR ISOLATED PHASE
BUS BARS AND DUCTS
Arthur B. Niemoller, Monroeville, Pa., assignor to Westinghouse Electric Corporation, East Pittsburgh, Pa., a corporation of Pennsylvania
Filed Oct. 29, 1964, Ser. No. 407,346
6 Claims. (Cl. 174—88)

This invention relates to electrical bus structures and more particularly to metal-enclosed isolated phase bus structures of the type disclosed in my copending application Ser. No. 407,347 filed Oct. 29, 1964 which is assigned to the same assignee as the present application and which issued Nov. 7, 1967 as U.S. Patent No. 3,351,705.

In certain types of isolated phase bus equipment, it is desirable that the successive housing sections which surround each of the phase conductors be electrically continuous to improve magnetic shielding around each phase conductor or for other reasons. In addition, it is desirable in certain applications as disclosed in detail in my copending application previously mentioned that the successive housing sections which surround each phase conductor be structurally joined together with the phase conductor in each housing being supported by means which transmits the supporting forces entirely through the housing itself. Certain problems arise in providing isolated phase bus equipment of the type described due to the thermal expansion and contraction of different portions of each phase conductor and its associated housing during the operation of the equipment along with certain bending movements which may occur in different portions of each phase conductor and its associated housing, particularly where unaligned portions of a phase conductor and its associated housing are electrically and structurally interconnected. The latter problems may also be complicated in certain applications by the requirement that the phase conductor be properly positioned within its associated housing in order to maintain certain electrical insulating clearances between the conductor and the housing or to limit the mechanical forces which result during a short circuit condition or in other applications by the requirement that certain portions of the phase conductor are required to structurally support at least part of the weight of one of the conductor portions which are electrically and structurally interconnected. It is therefore desirable to provide an improved means for interconnecting unaligned portions of a phase conductor and to provide an improved means for electrically connecting successive housing sections which are joined in an expansion or hinge joint.

It is an object of this invention to provide a new and improved electrical bus structure.

Another object of this invention is to provide an improved means for joining unaligned bus conductors.

A further object of this invention is to provide an improved means for electrically connecting housing sections in a joint structure for isolated phase bus equipment.

A still further object of this invention is to provide an improved means for positioning a bus conductor connecting unaligned bus conductors within a housing.

Other objects of the invention will, in part, be obvious and will, in part, appear hereinafter.

For a fuller understanding of the nature and objects of the invention, reference should be had to the following detailed description taken in conjunction with the accompanying drawings, in which:

FIGURE 1 is a view, partly in side elevation and partly in section, of an isolated phase bus structure embodying the principal features of the invention;

FIG. 2 is an enlarged plan view of a portion of a joint structure utilized in the bus structure shown in FIG. 1;

2

Figures 5, 6:
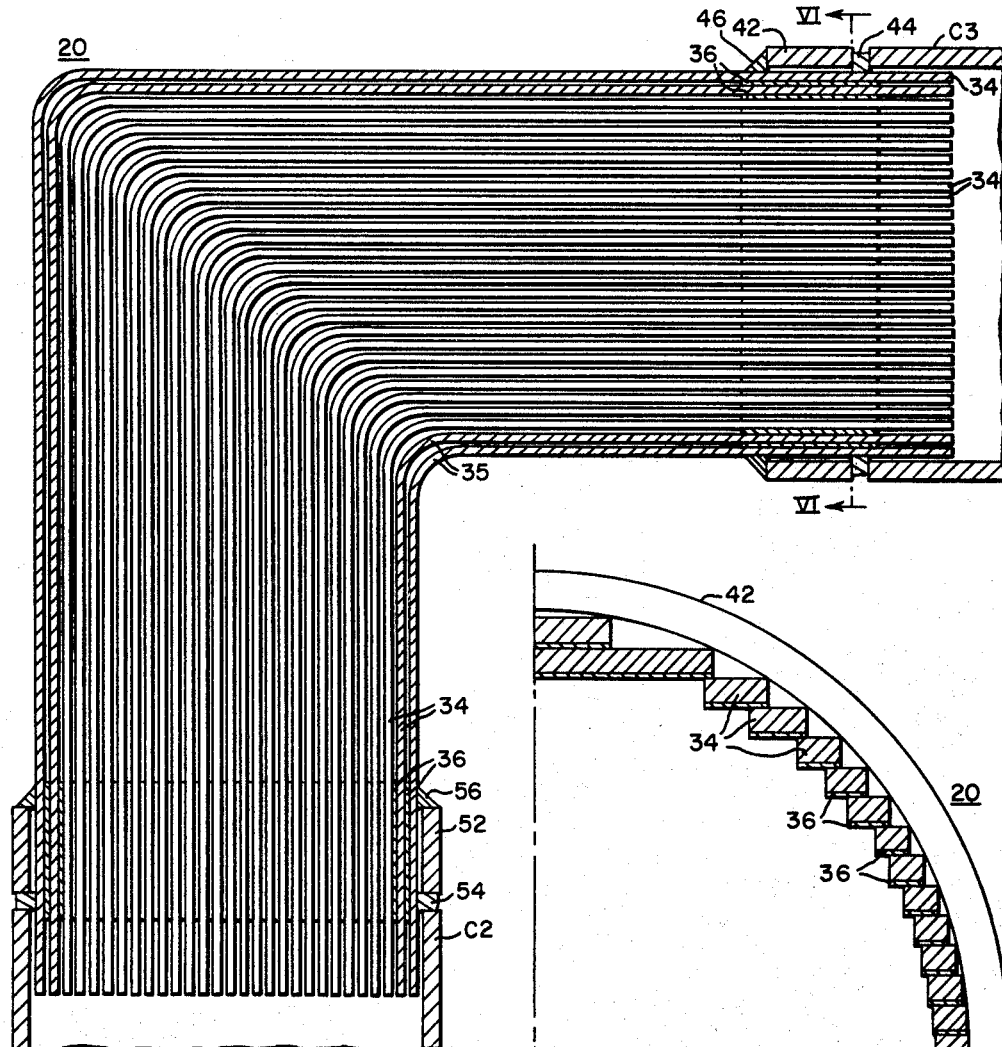

FIG. 3 is an enlarged view, partly in side elevation and partly in section, taken along the line III—III in FIG. 2 of the joint structure shown in FIG. 2;

FIG. 4 is a view, partly in end elevation and partly in section, taken along the line IV—IV in FIG. 3 of the joint structure shown in FIGS. 2 and 3;

FIG. 5 is an enlarged view, partly in side elevation and partly in section, of an electrically conducting member utilized in the bus structure shown in FIG. 1;

FIG. 6 is an enlarged view, partly in end elevation and partly in section, taken along the line VI—VI in FIG. 5 of the electrically conducting member shown in FIG. 5;

FIG. 7 is an enlarged plan view of a portion of a second joint structure utilized in the bus structure shown in FIG. 1; and FIG. 8 is an enlarged view, partly in side elevation and partly in section, taken along the line VIII—VIII in FIG. 7 of the joint structure shown in FIG. 7.

Referring now to the drawings and FIG. 1 in particular, there is illustrated one phase of a three-phase isolated phase bus structure 10 which is of the type disclosed in greater detail in my copending application previously mentioned. Each phase of the bus structure 10 comprises a phase bus conductor which in this instance includes the conductor portions C1, C2 and C3 and the associated housing sections H1, H2 and H3 for enclosing the conductor portions C1, C2 and C3, respectively, as well as the electrically conducting member 20 which is provided to electrically and structurally interconnect the adjacent ends of the unaligned conductors C2 and C3, as will be explained in detail hereinafter. The other phases of the bus structure 10 would be identical to that shown in FIG. 1 and would be laterally spaced from the phase shown in FIG. 1. In a typical application, the bus structure 10 may be employed to electrically interconnect a first electrical apparatus or source of electric power, such as a generator, which might be electrically connected to the conductor C1 and a second electric apparatus, such as a transformer which might be electrically connected to the conductor C3 to carry relatively high currents between said apparatus at relatively high potentials or voltages, such as 15 kv. or 23 kv. The conductors C1, C2 and C3 may have any suitable shape or cross section which provides the required current carrying capacity and in this instance are illustrated as being tubular or hollow cylindrical in shape, as shown in FIGS. 1 and 3.

In order to support and position the phase conductor portions C1, C2 and C3, as well as the electrically conducting member 20 within the associated housing sections, the spaced insulating supports or insulators 22 and 24 are provided as described in detail in my copending application previously mentioned with the forces supporting said conductor portions being transmitted entirely through the associated housing sections to any external supporting means such as the overhead hangers 32 in this instance which are spaced along and secured to the respective housing sections, as described in detail in my copending application. The insulators 22 shown in FIG. 1 are of the type which substantially prevent radial movement of the associated conductor portions C1, C2 and C3 but permit limited axial movement of said conductor portions during the thermal expansion and contraction of said conductor portions which result during the operation of the bus structure 10. On the other hand, the insulators 24 shown in FIG. 1 are of the type described in my copending application which are secured to the associated conductor portions to both substantially prevent radial movement of said conductor portions within the associated housing sections and also to substantially prevent axial movement of the associated conductor portion at the point of said conductor portion to which the insulators 24 are secured. It is to be noted that in this instance the conductor portions C1 and C3 are substantially horizontally extending conductor portions which are offset or vertically displaced from one another while the conducting portion C2 is a substantially vertically extending conductor portion with the axes of the conducting portions C2 and C3 intersecting at an angle of substantially 90°. It is also to be noted that the space between each of the conductor portions C1, C2 and C3 and the electrically conducting member 20 and the associated housing sections is substantially filled with a suitable insulating fluid, such as air or other insulating gas. The housing sections H1, H2 and H3 are preferably formed from a suitable nonmagnetic, electrically conducting material, such as aluminum in order to magnetically shield the magnetic fluxes which are produced when current flows in the conductor portions C1, C2 and C3 of the different phases of the bus structure 10, to insure the safety of operating personnel and to prevent the occurrence of a line to line or phase to phase fault condition during operation of the bus structure 10.

In order to electrically and structurally interconnect the adjacent ends of the unaligned conductors C2 and C3 as shown in the FIG. 1, the electrically conducting member 20 is provided. As best shown in FIGS. 5 and 6, the conducting member 20 comprises the first and second conducting end members or rings 42 and 52, respectively, which are disposed adjacent to and secured to the respective ends of the conductors C3 and C2 by any suitable means such as the welds, indicated at 44 and 54, respectively. The end members 42 and 52 are preferably formed from a conducting material, such as aluminum or copper and preferably have the same shape as the associated conductors C3 and C2, respectively. The conducting member 20 also includes a plurality of substantially parallel conducting bars or straps 34, as best shown in FIG. 6, with the opposite ends of said conductor straps or segments being electrically connected to and secured to the respective end members 42 and 52 and in turn to the adjacent ends of the conductors C2 and C3 by any suitable means, such as the welds indicated at 46 and 56, respectively. It is to be noted that the conducting straps 34 are disposed with the opposite ends of said conducting straps inside the associated end members 42 and 52, respectively, and also inside the associated conductors C2 and C3, respectively, so that the electrical insulating clearance between the different conducting straps 34 which make up the electrical conducting member 20 and the associated housing section H2 is normally no less than the radial distance between the outer surface of the conductors C1, C2 and C3 and the associated housing sections H1, H2 and H3, respectively. Each of the conducting straps 34 includes a portion at a point approximately midway along its length, as indicated at 35 in FIG. 5, which is bent at substantially the same predetermined angle as the other conducting straps 34, which in this instance is substantially 90° since the axes of the associated conductors C2 and C3 which the conducting member 20 interconnects intersect at an angle of substantially 90°.

In order to permit limited movement of the intermediate portions of the conducting straps 34 with respect to one another during the operation of the bus structure 10, the conducting straps 34 are spaced from one another where the adjacent portions of said conducting straps pass through or are secured to the associated end members 42 and 52, respectively, by the space members 36. Each of the conducting straps or rod 34 is formed from a conducting material, such as aluminum or copper, which has sufficient resilience to deform or deflect and permit a limited variation in the angle of the bent portions 35 of said conducting straps to thereby permit limited bending movements of the interconnected conductors C2 and C3 or to permit a limited amount of longitudinal thermal expansion and contraction of the interconnected conductors C2 and C3. It is to be noted that the opposite ends of the conducting straps 34 are distributed around the inner periphery of the associated end members 42 and 52, respectively, so that the conducting member 20 has an overall configuration which is hollow cylindrical or tubular with a current carrying capacity which is substantially equal to that of each of the interconnected conductors C2 and C3 respectively. The conducting material from which the conducting straps or rods 34 are formed should on the other hand possess sufficient rigidity or mechanical strength so that the conducting member 20 is capable of supporting at least part of the weight of one of the interconnected conductors, which in this instance is the conductor C2, where required in a particular application. As illustrated, the conductor straps 34 are substantially rectangular in cross section of a predetermined thickness to provide the resilience and stiffness characteristics indicated above.

It is also important to note that the characteristics of the conducting member 20 assist in maintaining the proper position of both itself and the associated conductors C2 and C3 within the associated housing sections during the operation of the bus duct 10 in order to maintain the minimum electrical insulating clearances between said conductors and the associated housing sections and between the conducting member 20 and the housing section H2 which is approximately six to eight inches when the phase conductors of the bus structure 10 are maintained at a potential of 15 kv. and approximately nine to eleven inches when the phase conductors of the bus structure 10 are maintained at an operating potential of 23 kv. in order that the bus structure 10 be capable of withstanding the surge voltages which may occur during the operation of the bus structure 10 as indicated by the basic impulse levels specified in the standards for isolated phase bus equipment having the respective voltage ratings. The electrically conducting member 20 functions therefore as both an expansion joint to permit expansion and contraction of at least one of the interconnected unaligned conductors C2 and C3 and as a hinge joint to permit limited bending movements of said conductors with respect to each other and also to assist in maintaining the desired position of the phase conductors within the associated housing and, where required, to assist in supporting the weight of at least one of the interconnected conductors.

In order to provide an expansion and hinge joint between the housing sections H2 and H3, the joint structure 50 is provided, as best shown in FIGS. 2 and 3. In particular, the joint 50 comprises a housing section 62 which telescopes over both of the housing sections H2 and H3 and is preferably formed from the same conducting material as the housing sections H2 and H3. The housing section 62 is secured to one of the housing sections H2 and H3, which in this instance is the housing section H3 by any suitable means, such as the weld indicated at 68 with the housing section 62 being free to move axially with respect to the housing section H2 during longitudinal thermal expansion and contraction of said housing sections and to permit limited bending movement of the housing sections H2 and H3 with respect to one another. In order to substantially seal the portion of the joint 50 adjacent to the free end of the housing section 62 and the housing section H2, the circumferential gasket 64 is provided having a generally L-shaped cross section. The gasket 64 is compressed against the associated housing sections by the clamping band 66 which is shaped to fit the outsideof the gasket 64.

In order to electrically connect the adjacent ends of the housing sections H2 and H3, a plurality of bridging or shunting conductor assemblies 60 are spaced around the periphery of said housing sections, as shown in FIG. 4. As best shown in FIGS. 2 and 3, each of the bridging conductor assemblies 60 includes the first and second bracket members or ring supports 72 and 74 which extend around the periphery of the associated housing sections H2 and H3, respectively, and are secured thereto by suitable means, such as welding or brazing. The terminal conducting plates 73 and 75 are secured or fastened to the associated ring supports 72 and 74, respectively, by suitable means, such as bolts. Each of the bridging conductor assemblies 60 also includes a flexible conductor 76 which is disposed to extend between the housing sections H2 and H3 in a generally zig-zag or serpentine configuration with a plurality of spaced portions of said flexible conductor being alternately secured to the respective terminal plates 73 and 75 by suitable means, such as brazing or welding to provide a plurality of parallel conducting paths between the associated housing sections H2 and H3. In order to provide additional support for the flexible conductor 76 or to provide a convenient guide means for the assembly of each of the bridging conductor assemblies 60, the bracket members 77 and 79 may be secured to each of the terminal conducting plates 73 and 75, respectively, each of the bracket members 77 and 79 including a plurality of spaced slots or openings to receive the different portions of the flexible conductor 76 during the assembly thereof. It is to be noted that a continuous electrically conducting path extends from the housing section H2 through the support ring 72, the terminal conducting plate 73, the flexible conductor 76, the terminal conducting plate 75 and the support ring 74 to the housing section H3, said support rings, terminal plates and the flexible conductor 76 being all formed from a suitable conducting material, such as aluminum or copper.

In order to mechanically isolate the housing sections H1 and H2 from one another, to allow limited bending movement of said housing sections with respect to one another and in certain applications, to allow for longitudinal expansion and contracting of the housing section H1, the joint structure 40 is provided, as best shown in FIGS. 7 and 8. The joint structure 40 is provided between the housing sections H1 and H2. It is to be noted that the connection between the ends of conductors C1 and C2, around which the joint structure 40 is disposed, is formed as a flexible connection by interconnecting the adjacent spaced apart ends of the conductors C1 and C2 by flexible conductors, such as braided copper or a plurality of aluminum thin sheets or foils which are secured to the conductors C1 and C2 by any suitable means, such as welding or bolts. In general, the joint structure 40 is similar to the joint structure 50 previously described except that the axial length of the telescoping housing section 162, which in this instance is secured to the housing section H2 by any suitable means, such as welding, is sufficient to permit assembly of the flexible connection between the conductors C1 and C2, whose ends are axially spaced from one another, at the location where the bus duct structure 10 is to be installed. In other words, the telescoping section 162 may be moved longitudinally to permit the flexible conductors which extend between the adjacent ends of the conductors C1 and C2 to be secured to the ends of the conductors C1 and C2. The telescoping housing section 162 may then be finally positioned with one end being secured or welded to the housing section 82 and the gasket 164 along with the clamping band 166 being assembled around the free end of the telescoping housing section 162, as shown in FIG. 8.

In order to electrically connect the adjacent ends of the housing sections H1 and H2, a plurality of bridging conductor assemblies 70 are provided around the periphery of said housing sections similarly to the bridging conductor assemblies 60, previously described in detail. The bridging conductor assembly 70 differs from the bridging conductor assembly 60 in that one of the ring supports, which in this instance is the ring support 74, is secured to the telescoping housing section 162 by suitable means, such as welding, and the electrically conducting path between the bridging conductor assembly 70 and the housing section H2 is completed by a plurality of peripherally spaced conducting strap members 181 which are secured and electrically connected at one end to the ring support 74 and at the other end secured to and electrically connected to the housing section H2. It is to be noted that the current carrying capacity of the plurality of bridging conductor assemblies 70 is substantially equal to the current carrying capacity of each of the electrically interconnected housing sections H1 and H2 while the current carrying capacity of the bridging conductor assemblies 60 previously described is substantially equal in total to the current carrying capacity of each of the electrically interconnected housings H2 and H3 previously described.

In summary, an electrically conducting member 20 in a bus structure as disclosed performs several important functions and is particularly adapted to bus structure of the type disclosed in my copending application previously mentioned in which each phase conductor is supported within the associated housing by means which transmits the supporting forces entirely through the associated housing. The conducting member 20 both electrically and structurally interconnects the adjacent ends of two unaligned conductors, such as the conductors C2 and C3, while permitting thermal expansion and contraction of at least one of the conductors into the conducting member 20 and permitting a limited bending movement of the interconnected conductors with respect to each other, as previously described. In addition the conducting member 20 assists in positioning the interconnected conductors as well as itself within the associated housing sections and, where required, is adapted to support at least a portion of the weight of one of the interconnected conductors, as illustrated in FIG. 1. As previously mentioned, the current carrying capacity of the conducting member 20 is substantially equal to that of each of the interconnected conductors and is adapted to maintain a predetermined minimum electrical insulating clearance between itself and the associated housing and between the interconnected conductors and the associated housing sections. It is to be noted that each of the conductor straps or rods which make up the conducting member 20 is free to move independently of the associated conductor straps between the ends of said conductor straps which are secured to the associated end members and to the interconnected conductors without binding or interfering with the movement of the associated conductor straps to the degree permitted by the spacing provided between said conductor straps until the adjacent conductor straps engage to permit a limited variation in the bend angle of the conductor straps which make up the conducting member 20.

It is to be understood that the teachings of the invention may be applied to single phase bus structures, as well as to three-phase bus structures and to applications where the interconnected conductors may both lie in substantially the same horizontal plane, as well as in applications, as illustrated in FIG. 1, in which one of the interconnected conductors is disposed substantially vertically.

In the overall operation of the bus structure 10, as the interconnected conductors C2 and C3 heat up during operation or as the ambient environmental temperature changes, the upper end of the conductor C2 is permitted to expand or contract to thereby deform the resilient conductor straps 34 which make up the conducting member 20 and to vary the effective bend angle of each of the resilient conductor straps within a limited range. In addition, the conducting member 20 is adapted to permit a limited bending movement of the interconnected conductors C2 and C3 with respect to each other and to permit a small amount of thermal expansion and contraction of the portion of the conductor C3 to the left of the supporting insulator 24 which is adjacent to the joint 50 which restrains movement of the conductor C3 at the point of connection both radially and axially.

The apparatus embodying the teachings of this invention has several advantages. For example, the conducting member 20 permits thermal expansion and contraction of at least one of the interconnected conductors and also permits a limited bending movement of the interconnected conductors with respect to each other while assisting in both positioning itself and the interconnected conductors within the associated housings and, where required, supporting at least a portion of the weight of one of the interconnected conductors, as illustrated in FIG. 1. The conducting member 20 as disclosed also assists in both positioning the assoicated interconnected conductors and itself within the associated housings and also, where required, assists in supporting the weight of at least one of the interconnected conductors. A joint structure 40 or a joint structure 50 as disclosed provides an electrical connection between successive housings while permitting limited axial movement of the interconnected housings with respect to each other and facilitates the assembly of such electrical connections with the associated housings.

Since numerous changes may be made in the above described apparatus and different embodiments of the invention may be made without departing from the spirit and scope thereof, it is intended that all the matter contained in the foregoing description or shown in the accompanying drawings shall be interpreted as illustrative and not in a limiting sense.

I claim:

1. An electrically conducting member adapted to interconnect the adjacent ends of two unaligned conductors comprising first and second hollow cylindrical end members, a plurality of substantially parallel, laterally spaced, elongated conductor segments extending between said end members, each of said conductor segments being substantially rectangular in cross-section, the ends of said conductor segments being secured to the respective end members and distributed around the inner periphery thereof, adjacent portions of each of said conductor segments being bent at substantially the same predetermined angle and being sufficiently resilient to permit a limited variation in the bend angle thereof, and a plurality of spacers disposed between the adjacent ends of the respective conductor segments where said segments are secured to said end members to permit limited bending movement of the intermediate portions of said conductor segments with respect to one another.

2. An electrically conducting member adapted to interconnect the adjacent ends of two conductors disposed to meet at substantially a right angle comprising first and second hollow cylindrical end members, a plurality of substantially parallel, laterally spaced strap conductors extending between said end members with the ends of said strap conductors being secured to the respective end members and distributed around the periphery thereof, adjacent portions of each of said strap conductors being bent at substantially a right angle and being sufficiently resilient to permit a limited variation in the bend angle thereof, and a plurality of spacers disposed between the adjacent ends of the respective strap conductors where said strap conductors are secured to said end members to permit limited bending movement of the intermediate portions of said strap conductors with respect to each other.

3. In a bus structure, in combination, first and second cylindrical housings longitudinally spaced from one another, a third cylindrical housing telescoping over said first and second housings and being secured to one of said housings, and a flexible conductor disposed in a generally zig-sag configuration to bridge the space between said first and second housings with a plurality of spaced portions of said flexible conductor being secured to each of said first and second housings to form a plurality of conducting paths between said housing which are spaced around the periphery of each of said housings.

4. In a bus structure, in combination, first and second cylindrical housings longitudinally spaced from one another, a third cylindrical housing telescoping over said first and second housings and being secured to one of said housings, and a flexible conductor disposed in a generally zig-zag configuration to bridge the space between said first and second housings with a plurality of spaced portions of said flexible conductor being secured to each of said first and second housings to form a plurality of conducting paths between said housings which are spaced around the periphery of each of said housings, and bracket means secured to each of said first and second housings having a plurality of slots through which said flexible conductor passes.

5. A bus structure comprising a pair of conductors disposed in end-to-end relationship, flexible conductors connecting the ends of said pair of conductors, first and second housings spaced from and enclosing the respective conductors, said housings being longitudinally spaced from one another, a third housing secured to one of said first and second housings and telescoping over the other of said housings to permit expansion and contraction and limited hinged movement of said first and second housings, and means for electrically connecting said first and second housings during the expansion and contraction and limited hinged movement thereof comprising a flexible conductor disposed in a generally zig-zag configuration to bridge the space between the ends of said first and second housings with a plurality of spaced points of said conductor being alternately secured to said first and second housings.

6. A bus structure comprising a pair of conductors disposed in end-to-end relationship, flexible conductors connecting the ends of said pair of conductors, first and second housings spaced from and enclosing the respective conductors, said housings being longitudinally spaced from one another, a third housing secured to one of said first and second housings and telescoping over the other of said housings to permit expansion and contraction and limited hinged movement of said first and second housings, and means for electrically connecting said first and second housing during the expansion and contraction and limited hinged movement thereof comprising a flexible conductor disposed in a generally zig-zag configuration to bridge the space between the ends of said first and second housings with a plurality of spaced points of said conductor being alternately secured to said first and second housings, and bracket means secured to each of said first and second housing having a plurality of slots through which said flexible conductor passes.

References Cited

UNITED STATES PATENTS

| | | | |
|---|---|---|---|
| 409,181 | 8/1889 | DeFerranti | 174—21 |
| 833,290 | 10/1906 | Beffs | 174—94 |
| 2,706,744 | 4/1955 | Rudd | 174—99 |
| 439,391 | 10/1890 | Edison | 174—12 |
| 1,720,586 | 7/1929 | Allan et al. | 174—12 |

DARRELL L. CLAY, *Primary Examiner.*